United States Patent [19]

Cotter et al.

[11] 4,169,135

[45] Sep. 25, 1979

[54] PROCESS FOR PRODUCING VANADIUM CHLORIDES

[75] Inventors: John T. Cotter, Montvale, N.J.; Adam E. Skrzec, W. Nyack, N.Y.

[73] Assignee: Stauffer Chemical Company, Westport, Conn.

[21] Appl. No.: 873,297

[22] Filed: Jan. 30, 1978

[51] Int. Cl.² .................................................. C01G 31/00
[52] U.S. Cl. .................................... 423/492; 423/240; 423/241
[58] Field of Search ........................ 423/492, 240, 241

[56] References Cited

U.S. PATENT DOCUMENTS

| 2,675,890 | 4/1954 | Frey et al. ............................... 55/69 |
| 2,682,930 | 7/1954 | Krehma ................................. 423/240 |
| 2,969,852 | 1/1961 | Jacobson ............................... 423/62 |
| 3,128,150 | 4/1964 | Brothers ............................... 423/492 |
| 3,388,993 | 6/1968 | Peterson et al. ....................... 55/71 |

Primary Examiner—O. R. Vertiz
Assistant Examiner—Wayne A. Langel
Attorney, Agent, or Firm—Michael E. Zall

[57] ABSTRACT

Product yields are increased and effluent streams purified for disposal by an improved process for producing vanadium chlorides. The process comprises reacting vanadium oxide with chlorine and reactant carbon to produce substantially pure vanadium chlorides and an effluent stream containing vanadium chlorides and unreacted chlorine. The effluent stream is contacted with adsorptive carbon whereby the vanadium chlorides and chlorine are adsorbed thereon. The adsorptive carbon is subsequently recycled and used as the reactant carbon.

11 Claims, 2 Drawing Figures

PROCESS FOR PRODUCING VANADIUM CHLORIDES

BACKGROUND OF THE INVENTION

1. Field of the Invention

This invention relates to a process for producing vanadium chlorides by chlorinating vanadium oxides. More particularly, this invention relates to a process for producing vanadium oxytrichloride ($VOCl_3$) and vanadium tetrachloride ($VCl_4$) by reacting chlorine and carbon with vanadium pentoxide ($V_2O_5$) wherein the effluent stream from the process is substantially free of vanadium chlorides and chlorine.

2. Description of the Prior Art

Vanadium chlorides, such as vanadium oxytrichloride ($VOCl_3$), vanadium tetrachloride ($VCl_4$) and mixtures thereof, are used as components of co-catalyst systems for olefin polymerization.

Various methods are known for preparing vanadium oxytrichloride. According to Inorganic Syntheses, Volume 4, New York, 1953 page 80, vanadium pentoxide is reduced with hydrogen or carbon at a temperature in the range of from 600° C. to 1000° C. to vanadium trioxide, which is then transformed into vanadium oxytrichloride by a treatment with chlorine at a temperature of 500°-600° C. The final product obtained is strongly contaminated with vanadium tetrachloride and chlorine and, therefore repeated distillation over sodium is recommended for purification.

U.S. Pat. No. 3,355,244 to Carter et al., describes a process for preparing vanadium oxytrichloride by maintaining vanadium oxide, a carbon and an inert diluent in a fluidized bed and fluidizing the bed with chlorine. The gaseous reaction products recovered overhead from the fluidized bed are initially passed into a cyclone separator to remove any entrained solids. The resulting crude vanadium oxytrichloride gases are then fed to a quench condenser wherein they are quenched in a counter current circulating stream of liquid vanadium oxytrichloride. The condensed vanadium oxytrichloride product is then subsequently treated, e.g. by fractional distillation, to obtain a highly purified vanadium oxytrichloride product. The gaseous effluent stream, from this process, however, contains unrecovered vanadium chlorides and unreacted chlorines, necessitating the use of expensive auxiliary equipment to remove these products and reducing yields by wasting chlorine, vanadium and vanadium chlorides.

The production of vanadium tetrachloride and vanadium oxytrichloride mixtures by the intereaction of vanadium pentoxide, carbon and chlorine at elevated temperatures is known from Z. Chem. 2, 376-7, (1962). The basic reaction is known from U.S. Pat. No. 1,415,028 to Methods are known for producing vanadium tetrachloride. British Pat. No. 1,308,738 describes the chlorination of vanadium pentoxide in a fluidized bed of particulate vanadium pentoxide and carbon at 425° C. The resultant product stream containing predominantly vanadium oxytrichloride is then chlorinated in a second fluidized bed at 600° C. in the presence of activated carbon to produce a product stream containing predominantly vanadium tetrachloride and minor quantities of vanadium oxytrichloride. The vanadium oxytrichloride and vanadium tetrachloride are then separated by fractional distillation.

Thus, generally, vanadium chlorides, such as vanadium oxytrichloride and vanadium tetrachloride are prepared by subjecting a vanadium oxide or vanadium oxide ore to the action of chlorine at elevated temperatures in the presence of a reactant carbon to produce a gas stream containing gaseous vanadium chlorides. Usually this gas stream contains, in addition to vanadium chlorides, carbon dioxide, carbon monoxide and unreacted chlorine. The bulk of the vanadium chlorides are separated from the gas mixture by condensation. However, as a result of the comparatively high vapor pressures of the vanadium chlorides, substantial amounts thereof will remain in the effluent stream along with the carbon dioxide and unreacted chlorine.

The vanadium chlorides remaining in the effluent stream after condensation, will generally amount to from about 2 to about 10% of the total vanadium chlorides produced, but most likely about 2 to about 4%. Obviously, such amounts of vanadium chlorides in the effluent stream along with the loss of unreacted chlorine represents a large economic loss as well as a pollution problem.

All of the prior art processes suffer from the fact that the effluent stream from the process must be treated to remove the pollutants therefrom, e.g. chlorine, vanadium tetrachloride etc. Such treatment is typically accomplished with complicated and expensive apparatus and with no increase in yields or process efficiency.

For example, the effluent stream from the reaction of vanadium oxide with chlorine and carbon typically can contain carbon dioxide, carbon monoxide, chlorine vanadium oxytrichloride and minor quantities of vanadium tetrachloride. Known prior art methods of purifying such a gaseous effluent stream would consist of a caustic scrubbing process or absorption by $CCl_4$. Caustic scrubbing is costly in energy requirements and capital equipment and only converts an air pollution problem into a water pollution problem. Absorption of chlorine and vanadium oxytrichloride using $CCl_4$, besides being costly in energy requirement and capital equipment, affords only a partial solution to the problem, for excessive amounts of $CCl_4$ will be added to the gas effluent stream. Neither of these methods of purifying the effluent stream would increase product yields.

SUMMARY OF THE INVENTION

It is an object of this invention to provide a process for preparing vanadium chlorides wherein product yields are substantially increased over known prior art processes.

It is a further object of this invention to provide a process for preparing vanadium chlorides wherein the effluent stream therefrom is substantially free from vanadium chlorides and chlorine.

It has now been found that the foregoing objects can be attained by the process of this invention. The process is of the type wherein vanadium oxide is reacted with chlorine and reactant carbon to produce substantially pure vanadium chlorides and an effluent stream containing vanadium chlorides and unreacred chlorine, wherein the improvement comprises:

(a) contacting the effluent stream with adsorptive carbon whereby the vanadium chlorides and chlorine are removed from the effluent stream and adsorbed on the adsorptive carbon; and subsequently (b) recycling and using the adsorptive carbon as the reactant carbon.

DETAILED DESCRIPTION OF THE INVENTION

Vanadium chlorides are produced by reacting vanadium oxide with chlorine and reactant carbon.

The use of the term "vanadium chlorides" is meant to include all the chlorides of vanadium, including vanadium oxytrichloride (VOCl$_3$) and mixtures thereof. The vanadium chlorides of primary interest are however, vanadium oxytrichloride, vanadium tetrachloride and mixtures thereof.

For example, these vanadium chlorides can be produced by the following reactions:

REACTION I

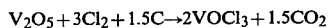

$$V_2O_5 + 3Cl_2 + 1.5C \rightarrow 2VOCl_3 + 1.5CO_2$$

REACTION II

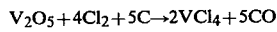

$$V_2O_5 + 4Cl_2 + 5C \rightarrow 2VCl_4 + 5CO$$

It is highly preferred that the reaction be accomplished in a fluidized bed system of the type well known in the art (see for example, U.S. Pat. No. 3,355,244 to Carter), or in a plurality of reaction zones (as in British Pat. No. 1,308,738).

Figure 1:
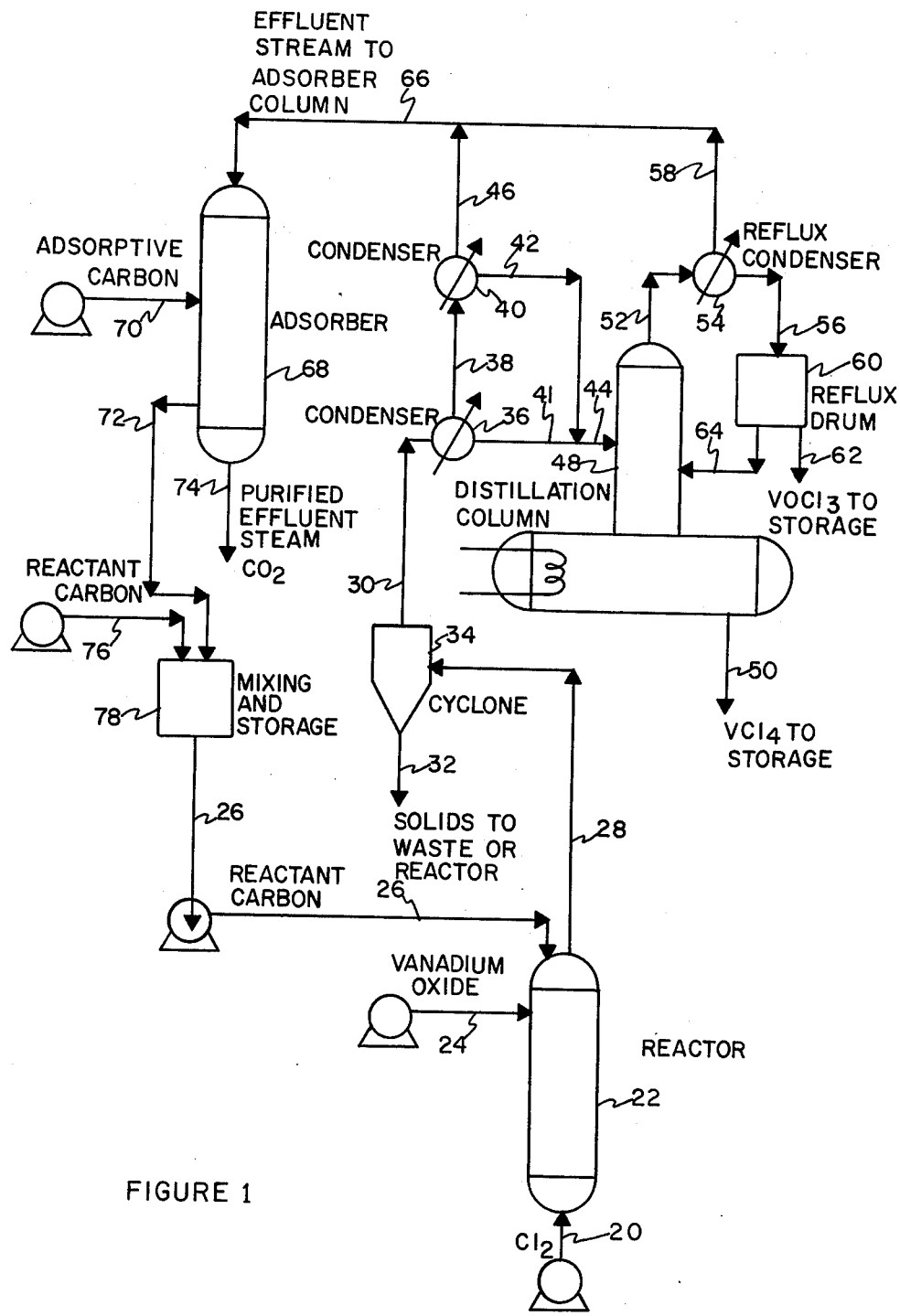
FIG. 1 is a diagrammatic representation of a preferred embodiment of the process of this invention.

Referring to FIG. 1, in a preferred embodiment reactant carbon (including the recycled adsorptive carbon) is introduced by feed line (26) into reactor (22).

The reactant carbon employed herein can be any carbonaceous reducing agent (including adsorptive carbon) which can effectively convert vanadium oxides to vanadium chlorides. It is believed that any amorphous carbon or any carbon containing amorphous carbon can be used as the reactant carbon. Although the particular type of reactant carbon is not critical, it is preferred to utilize coke, calcined petroleum coke and activated carbon. In a preferred embodiment of this invention the reactant carbon is the same type carbon as the adsorptive carbon, which is preferably an activated carbon. When employing a fluid bed system, as is preferred herein, it is necessary to employ a powdered reactant carbon.

While any type reactant carbon can be employed for the production of vanadium oxytrichloride, it has been found that material such as calcined petroleum coke is not sufficiently reactive for the production of vanadium tetrachloride. It has been discovered that if high yields of vanadium tetrachloride are required, an activated carbon is a preferred reactant carbon.

In the preferred embodiment depicted in FIG. 1, vanadium oxide is introduced by feed line (24) into reactor (22).

Although it will be understood that various vanadium oxides (with the vanadium metal having different valences) and vanadium oxide containing ores may be employed in the present process, the use of vanadium pentoxides or ores containing vanadium pentoxides are the preferred reactant materials.

It is particularly preferred that a high purity vanadium pentoxide be employed as the reactant material, particularly when a fluidized bed system is being used. For convenience therefore, the invention will be specifically described and illustrated with respect to the use of vanadium pentoxide as the reactant material.

Chlorine, preferably dry gaseous chlorine, is introduced into reactor (22) by feed line (20). The upflowing chlorine and the gaseous reaction products i.e. carbon dioxide, carbon monoxide and vanadium chlorides maintain fluidization of the carbon in the bed of reactor (22).

It is preferred to use up to about 5.% excess chlorine, i.e. about 5.% over that which is stoichiometrically required to convert the vanadium pentoxide to the desired vanadium chlorides. During periods of upset, however, as much as 25% excess chlorine may be present.

The reaction temperatures are from about 350° C. to about 800° C. High temperatures within the aforementioned range favor vanadium tetrachloride formation. Temperatures below 600° C. are preferred in order to permit the employment of a metallic reactor, e.g. nickel or INCONEL (International Nickel Co., Inc.). At temperatures substantially above 600° C. refractory or graphite lined reactors should be used.

The reaction temperature for producing vanadium chlorides is higher than the temperature at which adsorption of the vanadium chlorides and chlorine occur. This permits the vanadium chlorides and chlorine, which are adsorbed on the adsorptive carbon, to efficiently desorb from the carbon.

Again, referring to FIG. 1, the gaseous reaction mixture produced in reactor (22) (primarily vanadium chloride, unreacted chlorine, carbon dioxide, carbon monoxide and entrained solids) is passed by exit line (28) to cyclone (34). The entrained solids are separated from the gaseous reaction mixture and sent to waste or recycled to reactor (22) by cyclone exit line (32).

The gaseous mixture from cyclone (34) is passed by feed line (30) to condenser (36) wherein a substantial portion of the vanadium chlorides are condensed. Some chlorine may also be dissolved in the condensed liquid.

The residual gaseous material from condenser (36) is then passed by feed line (38) to condenser (40), i.e. an "after cooler," wherein a portion of the remaining vanadium chlorides are further condensed.

The residual gaseous material from condenser (40) is passed by exit line (46) to form a part of effluent stream (66).

The condensed liquid from condenser (36) and condenser (40) are passed to feed line (44) by exit lines (41) and (42). The condensed liquid in feed line (44) is passed into distillation column (48) wherein vanadium oxytrichloride and vanadium tetrachloride are separated.

The higher boiling vanadium tetrachloride is withdrawn by exit line (50) and sent to storage. The lower boiling vanadium oxytrichloride and unreacted chlorine are withdrawn by exit line (52) and passed to reflux condenser (54).

The residual gaseous material from reflux condenser (54) is passed by exit line (58) to form a part of effluent stream (66).

The condensed liquid from reflux condenser (54) is passed to reflux drum (60) by exit line (56).

At reflux drum (60) a portion of the condensed liquid, i.e. vanadium oxytrichloride, is returned by return line

(64) to distillation column (48) and a portion is withdrawn by exit line (62) and sent to storage.

The residual gaseous material from condenser (40) and reflux condenser (54) are collected by lines (58) and (46) and passed to effluent stream (66).

Generally, this effluent stream contains carbon dioxide, carbon monoxide, chlorine and vanadium chlorides. Typically, the effluent stream contains about 90–93% carbon dioxide and/or carbon monoxide, about 6–9% chlorine and about 4 to 0.5% vanadium chlorides, predominantly vanadium oxytrichloride.

The effluent stream is then contacted with adsorptive carbon whereby the vanadium chlorides and chlorine are removed from the effluent stream and adsorbed on the adsorptive carbon.

Referring to FIG. 1, the effluent stream (66) is passed through an adsorber column (68) which contains adsorptive carbon. The adsorptive carbon is introduced into column (68) by feed line (70). In adsorber column (68), the vanadium chlorides and chlorine are adsorbed on the carbon and the remaining gases (predominantly $CO_2$) are vented to the atmosphere by vent line (74).

The adsorptive carbon employed can be any carbonaceous reducing agent which can effectively adsorb vanadium chlorides and chlorine. It has been found that it is highly preferred that the adsorptive carbon have a high surface area, that is to say be an activated carbon.

Activated carbon is a well known material, and numerous descriptions of its preparation are given in the literature. Literature references which adequately describe the preparation of the activated carbon used in this invention may be found in "Industrial Chemistry" by E. R. Riegel, 3rd edition, p. 589 (1937); "Industrial Chemistry of Colloidal and Amorphous Materials," by Lewis, Squires, and Broughton (1943), pp. 74, 75 or in the "Encyclopedia of Chemical Technology," by Kirk-Othmer volume 2, pp. 881–898 (1948). The preparation of activated carbon consists essentially of removing adsorbed hydrocarbons from a porous amorphous-base carbon which is usually obtained by simple low-temperature distillation of a carbon-containing material, such as nutshells, wood, coal or peat. The removal of adsorbed hydrocarbons is usually accomplished at elevated temperatures by a combined oxidation and distillation involving the use of steam or the use of steam and air. As a result of such treatment internal pores are developed within the carbon material. In active carbons the surface area of these pores typically constitutes a major portion of the total surface area, which is in excess of 200 square meters per gram.

A preferred activated carbon is BARNABY CHENEY No. 346 activated charcoal of Barnaby Cheney Co., Inc. and WITCO Type 235 by Witco Chemical Co. Inc.

It is preferred that the quantity of adsorptive carbon used be no greater than and preferably about equal to the quantity of reactant carbon consumed. In order to accomplish this the unit adsorptive capacity of the adsorptive carbon for adsorbing vanadium chlorides and chlorine i.e. grams of vanadium chlorides and chlorine adsorbed per gram of adsorptive carbon, must be equal to or greater than the quantity of vanadium chlorides and chlorine in the effluent stream per unit weight, i.e. gram, of reactant carbon consumed.

The capacity of carbons to adsorb vanadium chlorides and chlorine are highly dependent on the unit surface area of the carbon, i.e. square meters/grams. The higher the unit surface area, the greater is the capacity for adsorbing vanadium chlorides and chlorine per unit weight carbon. Thus, knowing the quantities of vanadium chlorides and chlorine in the effluent stream and the quantity of reactant carbon consumed in the process, one skilled in the art can readily determine the type of adsorptive carbon to utilize so that the quantity of adsorptive carbon utilized is less than or, preferably, about equal to the quantity of reactant consumed.

The temperature of the effluent stream entering the adsorber should preferably be from about −30° C. to about 160° C., and most preferably from about −10° C. to about +10° C.

It has been found that a preferred manner of contacting the effluent stream with the adsorptive carbon is to pass the effluent stream through a bed of adsorptive carbon.

The adsorptive carbon, having adsorbed thereon the vanadium chlorides and chlorine is then recycled and used as the reactant carbon.

Referring to FIG. 1, the adsorptive carbon, is passed from adsorber (68) by exit line (72) to mixing and storage area (78) where this adsorptive carbon is mixed with makeup reactant carbon. This makeup reactant carbon is introduced into the mixing and storage area (78) by feed line (76).

The reactant carbon (including the recycled adsorbent carbon) is then passed from the storage and mixing area (78) into reactor (22) by feed line (26).

It has been found that when the adsorptive carbon is recycled and used as reactant carbon, the presence of vanadium chlorides and chlorine adsorbed thereon do not adversely effect the ability of the carbon to react with chlorine and vanadium oxide to produce vanadium chlorides.

The process of this invention has the flexibility of producing a broad range of concentrations of vanadium oxytrichloride and/or vanadium tetrachloride, i.e., a broad range of vanadium oxytrichloride to vanadium tetrachloride molar ratios. In the broadest sense, by varying the appropriate parameters and equipment, the process is capable of producing substantially all vanadium oxytrichloride or vanadium tetrachloride and producing only minor quantities of the other vanadium chloride.

Generally, the molar ratio of vanadium oxytrichloride to vanadium tetrachloride produced by the process of this invention is primarily dependent on four factors:

1. Reaction temperature—generally, higher temperatures, e.g. above 550° C. favor higher conversions to vanadium tetrachloride, i.e. decreased molar ratios of vanadium oxytrichloride to vanadium tetrachloride.

2. Type of reactant carbon—generally the greater the surface area per unit weight of carbon the greater the conversion to vanadium tetrachloride. Thus, for example, calcined coke is suitable for the production of high concentrations of vanadium oxytrichloride but is not sufficiently reactive for producing high concentrations of vanadium tetrachloride. To favor the production of vanadium tetrachloride an activated carbon is required.

3. Excess chlorine—the use of greater quantities of excess chlorine favors the production of higher conversions to vanadium tetrachloride.

4. Space velocity—space velocity is the volume of feed per hour divided by the unit volume of the reactant carbon bed. Generally, lower space velocities favor higher conversions to vanadium tetrachloride. A preferred range of space velocities for producing predominantly vanadium tetrachloride is from about 700 to about 2500 Hours$^{-1}$. Space velocities from about 900 hours$^{-1}$ to about 2000 hours are most preferred. A preferred range of space velocities for producing predominantly vanadium oxytrichloride is from about 450 to about 900 Hours$^{-1}$. Space velocities from about 600 to about 700 Hours$^{-1}$ are most preferred.

Pressure is not a critical factor in the process of this invention. Pressure either below or above atmospheric can be employed, however, for economic reasons operation at atmospheric pressure is preferred.

Although the preferred method of practicing the present invention involves a continuous operation, it is also possible to operate the system on a semi-continuous or batch basis.

The following non-limiting examples will serve to illustrate the invention.

EXAMPLE 1

CHLORINE CAPACITY OF ADSORPTIVE CARBON

Several carbons were tested for use as adsorptive carbons to determine the capacity of carbons to adsorb chlorine.

The following carbons were tested:

| Carbon | Surface Area (M$^2$/grams) |
|---|---|
| Amax Carbon[1] | 5–8 |
| Barnaby-Cheney No. 346[2] | 350–400 |
| Witco-Type 235[3] | 850 |

[1]Sold by Amax Co., Inc.
[2]Sold by Barnaby-Cheney Co., Inc.
[3]Sold by Witco Chemical Corp., Inc.

400 grams of the indicated carbon was placed in a glass adsorption column. Chlorine gas from a cylinder was metered and directed into the windbox of the column and distributed through a porous support place to the carbon bed. The chlorine feed temperature was maintained at about 20° C. Gas samples were periodically taken from the top of the column and analyzed for chlorine. When chlorine first appeared at the top of the column ("breakthrough") the test was terminated. The carbon was removed from the adsorber and weighed. The gain in weight was the amount of chlorine adsorbed by the carbon.

Figure 2:
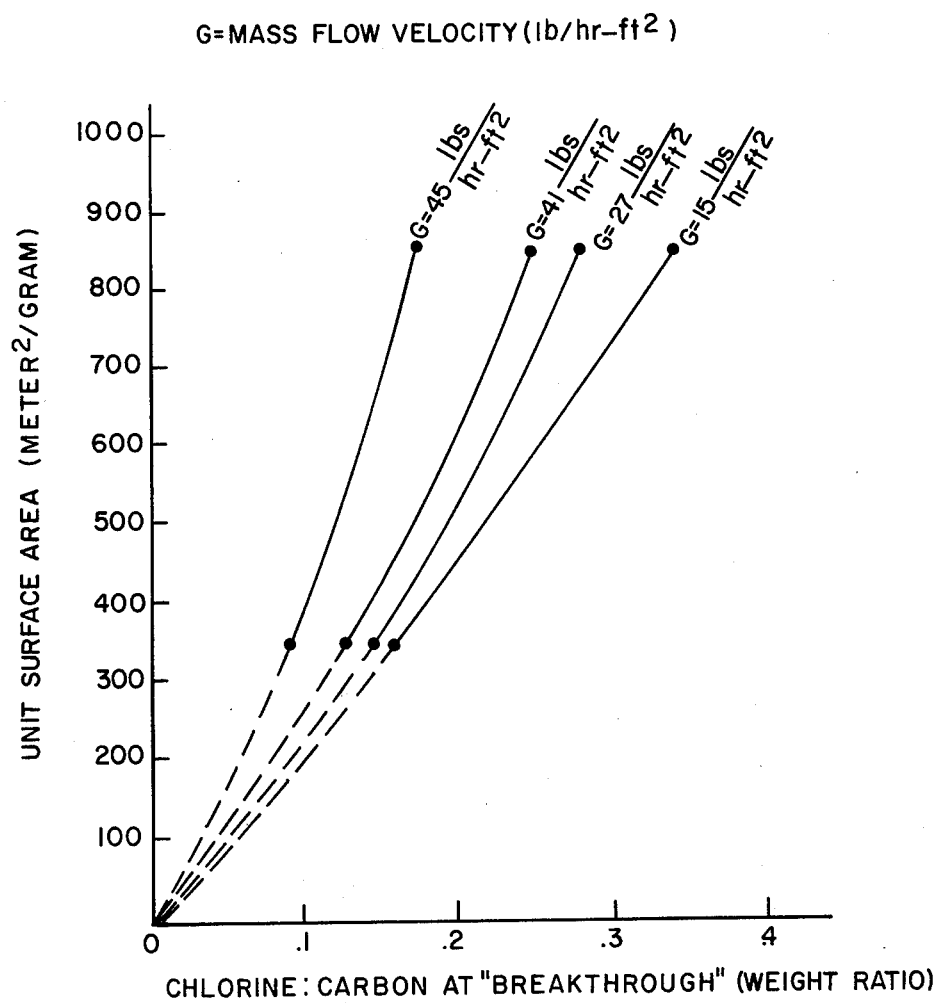
FIG. 2 is a graph of the adsorptive capacity of carbon for chlorine as a function of the surface area (meter$^2$/gram) of the carbon.

The results are indicated below, in table form. and graphically in FIG. 2:

WITCO - Type 235 Carbon (850 M$^2$/gm.)

| Chlorine Feed (gms/min) | Chlorine:Carbon Wt. Ratio at "Breakthrough" | "G" Mass Flow Velocity (lb./hr.-ft$^2$) |
|---|---|---|
| 7.5 | .173 | 45.3 |
| 6.75 | .25 | 40.8 |
| 4.5 | .28 | 27.2 |
| 2.5 | .34 | 15.4 |

BARNEBY - CHENEY No. 346 Carbon (350–400 M$^2$/gm.)

| Chlorine Feed (gms./min.) | Chlorine:Carbon Wt. Ratio at "Breakthrough" | "G" Mass Flow Velocity (lb./hr.-ft$^2$ |
|---|---|---|
| 7.5 | .09 | 45.3 |
| 6.75 | .13 | 40.8 |
| 4.5 | .15 | 27.2 |
| 2.5 | .16 | 15.4 |

AMAX COKE (5–8 M$^2$/gm.)

No chlorine adsorbed at "Breakthrough".

The foregoing tests indicate that as the surface area of the adsorptive carbon is increased the capacity of the carbon to adsorb chlorine increases. Additionally as the mass flow velocity of the chlorine through the adsorption column decreases, the capacity of the carbon to adsorb chlorine increases.

By the use of the foregoing procedure and with knowledge of the amount of chlorine in the effluent stream one can select a carbon, i.e. unit surface area, such that the quantity of adsorptive carbon used is less than the quantity of reactant carbon consumed in the reaction, or as may be preferred, make such quantities about equal to each other.

EXAMPLE 2

ADSORPTION OF VANADIUM CHLORIDE AND CHLORINE 400 grams of WITCO Type 235 carbon (850 M$^2$/gm) was placed in a glass adsorption column. Chlorine gas, vanadium oxytrichloride gas and nitrogen were metered and directed into the windbox of the column and distributed through a porous support plate to the carbon bed. The temperature of the feed stream was maintained at a temperature of about 20° C. Gas samples were periodically taken from the top of the column and analyzed for chlorine and vanadium oxytrichloride and the quantity of chlorine and vanadium oxytrichloride adsorbed on the carbon determined. The results are indicated below:

TABLE I

| Cumulative Time (Min.) | Feed Rate (gms/min) | | | VOCl$_3$ Out gms/min | VOCl$_3$ Absorbed gms/min |
|---|---|---|---|---|---|
| | N | Cl | VOCl$_3$ | | |
| 0 | 3.77 | .61 | .44 | — | — |
| 15 | ↓ | ↓ | ↓ | .0057 | .4343 |
| 21 | ↓ | ↓ | ↓ | ↓ | ↓ |
| 27 | ↓ | ↓ | ↓ | .005 | .435 |
| 33 | ↓ | ↓ | .527 | ↓ | .522 |
| 39 | ↓ | ↓ | ↓ | ↓ | ↓ |
| 45 | ↓ | ↓ | ↓ | ↓ | ↓ |
| 48 | ↓ | ↓ | .507 | ↓ | .502 |
| 54 | ↓ | ↓ | ↓ | ↓ | .502 |
| 57 | ↓ | ↓ | .527 | ↓ | .522 |
| 78 | ↓ | ↓ | ↓ | ↓ | ↓ |
| 90 | ↓ | ↓ | ↓ | ↓ | ↓ |
| 100 | ↓ | ↓ | ↓ | ↓ | ↓ |
| 115 | ↓ | ↓ | ↓ | ↓ | ↓ |
| 120 | ↓ | ↓ | ↓ | .006 | .521 |

TABLE I-continued

| | | | | |
|---|---|---|---|---|
| 130 | ↓ | ↓ | ↓ | .007 | .52 |
| 142 | ↓ | ↓ | ↓ | .0173 | .509 |
| 148 | ↓ | ↓ | ↓ | .0115 | .515 |
| 154 | ↓ | ↓ | ↓ | .023 | .504 |
| 160 | ↓ | ↓ | ↓ | .0519 | .475 |
| 162 | ↓ | ↓ | ↓ | .0577 | .469 |
| 164 | ↓ | ↓ | ↓ | .075 | .452 |
| 166 | ↓ | ↓ | ↓ | .075 | .452 |
| 169 | ↓ | ↓ | ↓ | .08 | .447 |

| Cumulative Time (min.) | Chlorine Out gms/min | Chlorine Adsorbed gms/min | Adsorption Eff.(%) VOCl$_3$ | Cl | Adsorption Cumulative Wt. (gms) VOCl$_3$ | Cl$_2$ |
|---|---|---|---|---|---|---|
| 0 | — | — | — | — | — | — |
| 15 | 0 | .61 | 98.7 | 100. | 6.51 | 9.15 |
| 21 | ↓ | ↓ | 98.7 | ↓ | 9.13 | 12.81 |
| 27 | ↓ | ↓ | 98.8 | ↓ | 11.75 | 16.47 |
| 33 | ↓ | ↓ | 99.0 | ↓ | 14.63 | 20.13 |
| 39 | ↓ | ↓ | ↓ | ↓ | 17.758 | 23.79 |
| 45 | ↓ | ↓ | ↓ | ↓ | 20.89 | 27.45 |
| 48 | ↓ | ↓ | ↓ | ↓ | 22.396 | 29.28 |
| 54 | ↓ | ↓ | ↓ | ↓ | 25.408 | 32.94 |
| 57 | ↓ | ↓ | ↓ | ↓ | 26.974 | 34.77 |
| 78 | ↓ | ↓ | ↓ | ↓ | 37.936 | 47.58 |
| 90 | ↓ | ↓ | ↓ | ↓ | 44.2 | 54.9 |
| 100 | ↓ | ↓ | ↓ | ↓ | 49.42 | 61.0 |
| 115 | ↓ | ↓ | ↓ | ↓ | 57.25 | 70.5 |
| 120 | ↓ | ↓ | 98.8 | ↓ | 59.88 | 73.55 |
| 130 | ↓ | ↓ | 96.6 | ↓ | 65.15 | 79.65 |
| 142 | .0084 | .602 | 96.6 | 98.7 | 71.47 | 86.97 |
| 148 | .0078 | .602 | 96.6 | 98.7 | 74.63 | 90.63 |
| 154 | .0113 | .598 | 93.4 | 98 | 77.79 | 94.29 |
| 160 | .0253 | .585 | 89.1 | 95.9 | 80.95 | 97.95 |
| 162 | .0282 | .582 | 85.8 | 95.4 | 82 | 99.17 |
| 164 | .0366 | .573 | 85.8 | 93.9 | 83.058 | 100.39 |
| 166 | .0366 | .573 | 85.8 | 93.9 | 84.11 | 101.6 |
| 169 | .04 | .57 | 84.9 | 93.4 | 85.69 | 103.44 |

EXAMPLE 3

REACTION OF VANADIUM OXIDE CHLORINE AND REACTANT CARBON

A 600 grams of WITCO 235 carbon having adsorbed thereon 0.22 grams Cl$_2$/gram of carbon and 0.05 VOCl$_3$/gram of carbon was used as the bed in a 15 inch high 3 inch diameter electrically heated fluid bed reactor. Reactor temperature was maintained at 410°–415° C., vanadium pentoxide feed rate at 22.4 gms./min. providing about 3% excess chlorine and a superficial velocity of 0.28 ft./sec.

The results of this test were as follows:

| Time (min.) | Chlorine Efficiency[1] % | Vanadium Efficiency[2] % |
|---|---|---|
| 30 | 78 | 77 |
| 60 | 97.5 | 100 |
| 90 | 95.8 | 96 |
| 120 | 98.7 | 98 |
| 150 | 96.5 | 98 |
| 210 | 98.0 | 98 |

B 600 grams of WITCO 235 carbon having adsorbed thereon, 0.28 grams Cl$_2$/gram carbon and 0.12 grams VOCl$_3$/gram carbon was used as the bed in a 15 inch high 3 inch diameter electrically heated fluid bed reactor. Reactor temperature was maintained at 410°–415° C., vanadium pentoxide feed rate was 100 grams/10 minutes and chlorine feed rate at 24 grams/minute providing about 3% excess chlorine and a superficial velocity of 0.30 ft./sec.

The results of the test were as follows:

| Time (min.) | Chlorine Efficiency[1] (%) | Vanadium Efficiency[2] (%) |
|---|---|---|
| 30 | 77 | 68 |
| 60 | 95.7 | 97 |
| 90 | 97.8 | 96 |
| 120 | 98.1 | 98.5 |

[1]Chlorine Efficiency = $\dfrac{\text{Weight of chlorine in vanadium chloride products}}{\text{(Weight of chlorine on carbon) + (Weight of chlorine in feed)}}$

[2]Vanadium Efficiency = $\dfrac{\text{Weight of vanadium in vanadium chloride products}}{\text{(Weight of vanadium on carbon) + (Weight of vanadium in feed)}}$ Although the present invention has been disclosed in connection with a few preferred embodiments thereof, variations and modifications may be resorted to by those skilled in the art without departing from the principles of this invention. All of these variations and modifications are considered to be within the spirit and scope of the present invention as disclosed in the foregoing description and defined by the appended claims.

What is claimed is:

1. In a process for producing vanadium oxytrichloride, vanadium tetrachloride or mixtures thereof wherein vanadium oxide is reacted with chlorine and reactant carbon to produce substantially pure vanadium oxytrichloride, vanadium tetrachloride or mixtures thereof and an effluent stream containing vanadium oxytrichloride, vanadium tetrachloride or mixtures thereof and unreacted chlorine wherein the improvement comprises:
- (a) contacting the effluent stream with adsorptive carbon whereby the vanadium oxytrichloride, vanadium tetrachloride or mixtures thereof and chlorine are removed from the effluent stream and adsorbed on the absorptive carbon; and subsequently
- (b) recycling and using the adsorptive carbon as the reactant carbon.

2. The process of claim 1, wherein the vanadium oxide is vanadium pentoxide.

3. The process of claim 1, wherein the reactant carbon and the adsorptive carbon are the same type carbons.

4. The process of claim 1, wherein the reactant carbon and the adsorptive carbon are both an activated carbon.

5. The process of claim 1, wherein the adsorptive carbon is an activated carbon.

6. The process of claim 1, wherein the adsorptive carbon has a unit surface area of at least about 200 square meters per gram.

7. The process of claim 1, wherein the quantity of adsorptive carbon used is no greater than the quantity of reactant carbon consumed.

8. The process of claim 1, wherein the quantity of adsorptive carbon used is about equal to the quantity of reactant consumed.

9. The process of claim 1, wherein the adsorptive carbon has a unit adsorptive capacity for the vanadium chlorides and chlorine at least about equal to the quantity of vanadium chlorides and chlorine in the effluent stream per unit weight of reactant carbon consumed.

10. The process of claim 1, wherein the effluent stream is at a temperature of from about $-30°$ C. to about $160°$ C.

11. The process of claim 1, wherein the effluent stream is at a temperature of from about $-10°$ C. to about $+10°$ C.

* * * * *